United States Patent
Kitagawa et al.

(10) Patent No.: US 12,271,547 B2
(45) Date of Patent: Apr. 8, 2025

(54) DISPLAY DEVICE WITH TOUCH PANEL, AND METHOD OF CONTROLLING DISPLAY DEVICE WITH TOUCH PANEL

(71) Applicant: Sharp Display Technology Corporation, Kameyama (JP)

(72) Inventors: Daiji Kitagawa, Kameyama (JP); Jin Miyazawa, Kameyama (JP); Yousuke Nakamura, Kameyama (JP); Daisuke Suehiro, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/514,531

(22) Filed: Nov. 20, 2023

(65) Prior Publication Data

US 2024/0211066 A1 Jun. 27, 2024

(30) Foreign Application Priority Data

Dec. 27, 2022 (JP) .................. 2022-209382

(51) Int. Cl.
*G06F 3/041* (2006.01)

(52) U.S. Cl.
CPC ................ *G06F 3/0416* (2013.01)

(58) Field of Classification Search
CPC ..................................... G06F 3/0416
See application file for complete search history.

(56) References Cited

U.S. PATENT DOCUMENTS

| | | | |
|---|---|---|---|
| 2016/0085363 A1 | 3/2016 | Azumi et al. | |
| 2019/0146620 A1* | 5/2019 | Suyama | G06F 3/0412 345/174 |
| 2021/0019011 A1* | 1/2021 | Kitagawa | G02F 1/13338 |

FOREIGN PATENT DOCUMENTS

JP 2016-061934 A 4/2016

* cited by examiner

*Primary Examiner* — Robert J Michaud
(74) *Attorney, Agent, or Firm* — ScienBiziP, P.C.

(57) ABSTRACT

A display device with a touch panel includes a touch panel including a pixel electrode, and a control unit executing a write process of writing a data signal on the pixel electrode and a touch detection process by the touch panel. The control unit determines an executable number of times of the touch detection process based on the length of the pause period, alternately executes the touch detection process and the write process in the display period, and executes the touch detection process a number of times equal to or less than the determined executable number of times in the pause period.

3 Claims, 13 Drawing Sheets

DISPLAY DEVICE WITH TOUCH PANEL, AND METHOD OF CONTROLLING DISPLAY DEVICE WITH TOUCH PANEL

CROSS-REFERENCE TO RELATED APPLICATIONS

This application claims the benefit of priority to Japanese Patent Application Number 2022-209382 filed on Dec. 27, 2022. The entire contents of the above-identified application are hereby incorporated by reference.

BACKGROUND

Technical Field

The disclosure relates to a display device with a touch panel, and a method of controlling the display device with a touch panel.

Typically, a display device with a touch panel which is equipped with a video display function and a touch detection function is known. Such a display device with a touch panel is disclosed in, for example, JP 2016-61934 A.

The display device with a touch panel disclosed in JP 2016-61934 A displays one frame image in which a display period for performing display driving and a display pause period for not performing display driving are repeated. The display device with a touch panel is configured such that the length of the display pause period is one type of fixed length, and touch detection is performed during the display pause period. Thereby, in the display device with a touch panel, display driving and touch detection are alternately repeated in one frame period.

Typically, a display device that operates at a variable frame rate is also known. In such a type of display device, the length of a display pause period, out of a display period and the display pause period constituting one frame, is changed.

SUMMARY

Here, the display device that performs control by using the variable frame rate is also desired to have a function of detecting a touch by a pointer (a finger, a pen, or the like). That is, there is a demand for a display device with a touch panel that operates at a variable frame rate and a control method thereof.

Consequently, the disclosure has been conceived in order to solve the problems described above, and an object thereof is to provide a display device with a touch panel that operates at a variable frame rate and a control method thereof.

In order to solve the above-described problems, a display device with a touch panel according to a first aspect of the disclosure is a display device with a touch panel configured to operate at a variable frame rate that is realized by changing a length of a pause period out of a display period and the pause period, both the display period and the pause period constituting one frame, the display device including a touch panel including a pixel electrode, and a control unit configured to execute a write process of writing a data signal on the pixel electrode and a touch detection process by the touch panel, in which the control unit is configured to determine an executable number of times of the touch detection process based on the length of the pause period, alternately execute the touch detection process and the write process in the display period, and execute the touch detection process a number of times equal to or less than the determined executable number of times in the pause period.

A method of controlling a display device with a touch panel according to a second aspect is a method of controlling a display device with a touch panel including a pixel electrode and configured to operate at a variable frame rate that is realized by changing a length of a pause period out of a display period and the pause period, both the display period and the pause period constituting one frame, the method including determining an executable number of times of a touch detection process based on the length of the pause period, alternately executing a write process of writing a data signal on the pixel electrode and the touch detection process by the touch panel in the display period, and executing the touch detection process a number of times equal to or less than the determined executable number of times in the pause period.

According to the configuration described above, a display device with a touch panel that operates at a variable frame rate and a control method thereof can be provided.

BRIEF DESCRIPTION OF DRAWINGS

The disclosure will be described with reference to the accompanying drawings, wherein like numbers reference like elements.

DESCRIPTION OF EMBODIMENTS

Figure 1:
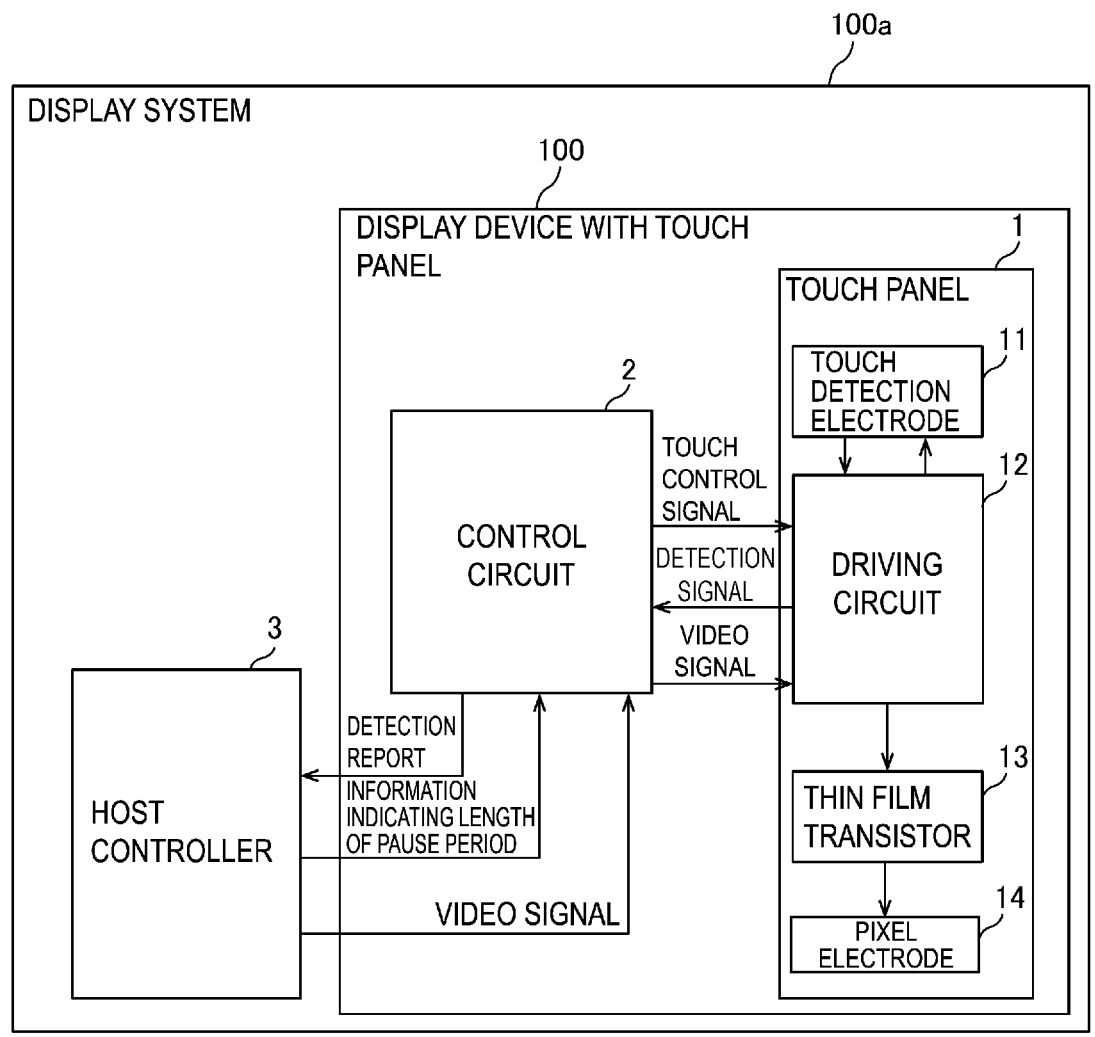
FIG. 1 is a block diagram illustrating a configuration of a display system 100a according to a first embodiment.

Hereinafter, embodiments of the disclosure will be described in detail with reference to the drawings. In the drawings, the same or corresponding portions are denoted by the same reference signs, and the description thereof will not be repeated. Note that, for ease of description, in the drawings referred to below, configurations may be simplified or schematically illustrated, and some components may be omitted. Further, dimensional ratios between components illustrated in the drawings are not necessarily indicative of actual dimensional ratios.

First Embodiment

A configuration of a display device 100 with a touch panel according to a first embodiment (hereinafter referred to as a "display device 100") and a configuration of a display system 100a according to the first embodiment will be described. FIG. 1 is a block diagram illustrating the configuration of the display system 100a according to the first embodiment.

As illustrated in FIG. 1, the display system 100a includes a display device 100 and a host controller 3. In FIG. 1, the display device 100 and the host controller 3 are illustrated as separate devices. However, a configuration functioning as the display device 100 and a configuration functioning as the host controller 3 may be integrally accommodated in one device.

The display device 100 includes a touch panel 1 and a control circuit 2. The display device 100 displays a video or an image on the touch panel 1. In addition, the display device 100 detects a touch by a pointer using the touch panel 1. Examples of the pointer include a finger and a pen. The control circuit 2 includes a processor that performs control processing related to touch detection of the touch panel 1 and control processing related to a display. The disclosure is not limited thereto, and the control circuit 2 may be disposed on the touch panel 1 (on a substrate).

Figure 2:
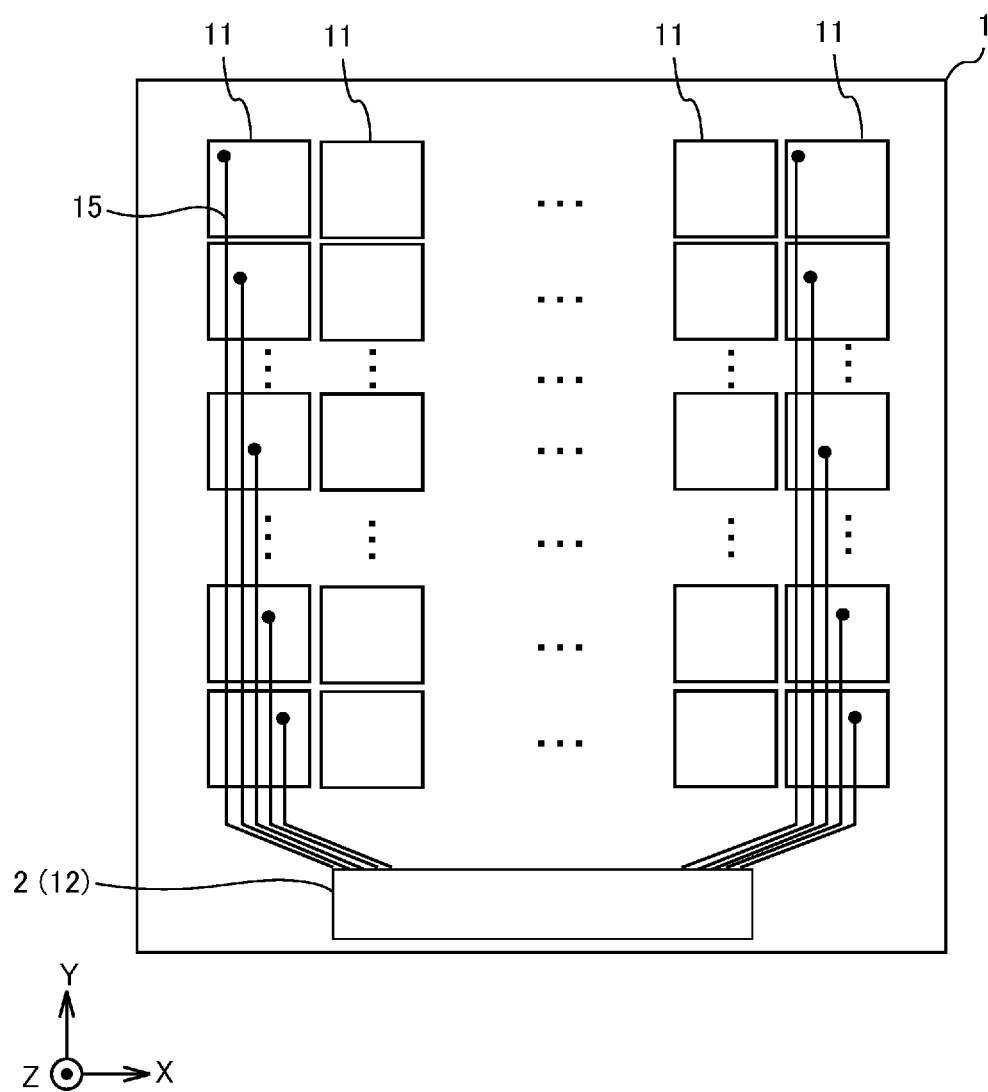
FIG. 2 is a plan view schematically illustrating a configuration of a touch panel 1.

FIG. 2 is a plan view schematically illustrating a configuration of the touch panel 1. As illustrated in FIG. 2, the touch panel 1 includes a touch detection electrode 11, a driving circuit 12, a thin film transistor 13, and a pixel electrode 14. In the first embodiment, the control circuit 2 is disposed on the touch panel 1. The disclosure is not limited to this example, and the control circuit 2 may be disposed outside the touch panel 1, and the control circuit 2 and the touch panel 1 may be connected by wiring (for example, a flexible printed circuit board). The touch panel 1 is, for example, an in-cell type touch panel. That is, the touch detection electrode 11 serves as both an electrode for detecting a touch and a counter electrode for generating an electrical field between the touch detection electrode 11 and the pixel electrode 14 for displaying a video. In FIG. 1, for ease of description, one touch detection electrode 11 and one pixel electrode 14 are illustrated. The driving circuit 12 includes, for example, one or a plurality of integrated circuits.

As illustrated in FIG. 2, a plurality of touch detection electrodes 11 are disposed in a matrix, for example. The driving circuit 12 includes a touch detection driver. The plurality of touch detection electrodes 11 and the driving circuit 12 (touch detection driver) are connected to each other via touch signal lines 15. Electrostatic capacitance of the touch detection electrodes 11 changes due to capacitive coupling between the touch detection electrodes 11 and the pointer. The driving circuit 12 supplies a touch driving signal (pulse signal) to the plurality of touch detection electrodes 11. A waveform of the pulse signal changes depending on the magnitude of the electrostatic capacitance of the touch detection electrodes 11. The driving circuit 12 detects a touch (touched position) of the pointer based on the waveform of the pulse signal (hereinafter referred to as a "detection signal") from the touch detection electrodes 11. That is, the touch panel 1 is a self-capacitive touch panel. The disclosure is not limited to this example, and the touch panel 1 may be configured as a mutual-capacitive touch panel. Hereinafter, a process of detecting a touch of the pointer on the touch panel 1 will be referred to as a "touch detection process".

Figure 3:
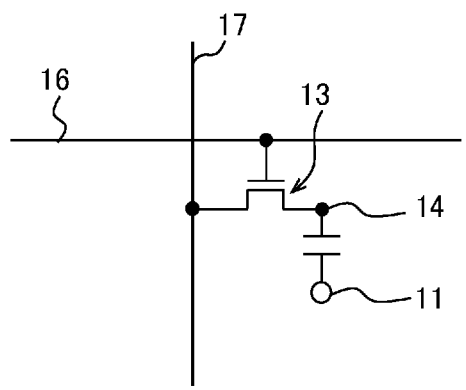
FIG. 3 is a circuit diagram illustrating a connection relationship between a thin film transistor 13 and a pixel electrode 14.

FIG. 3 is a circuit diagram illustrating a connection relationship between the thin film transistor 13 and the pixel electrode 14. The driving circuit 12 (see FIG. 1) further includes a gate driver and a source driver. The gate driver of the driving circuit 12 is connected to a gate line 16. The source driver of the driving circuit 12 is connected to a source line 17. A gate electrode of the thin film transistor 13 is connected to the gate line 16, and a source electrode of the thin film transistor 13 is connected to the source line 17. Further, a drain electrode of the thin film transistor 13 is connected to the pixel electrode 14. The pixel electrode 14 forms electrostatic capacitance between the pixel electrode 14 and the touch detection electrode 11. The touch detection electrodes 11 are provided to be common to a plurality of pixel electrodes 14 and function as common electrodes.

The gate driver of the driving circuit 12 supplies gate signals (scanning signals) sequentially to the plurality of gate lines 16. Further, the source driver of the driving circuit 12 supplies a data signal based on a video signal to each of the plurality of source lines 17. Thereby, when the thin film transistor 13 supplied with the gate signal is turned on, a data signal is written in the pixel electrode 14. A process of writing the data signal in the pixel electrode 14 will be hereinafter referred to as a "write process". Then, in the touch panel 1, a liquid crystal layer, which is not illustrated in the drawing, is driven due to an electrical field generated by the pixel electrode 14 and the touch detection electrode 11 (common electrode), thereby displaying a video.

Figure 4:
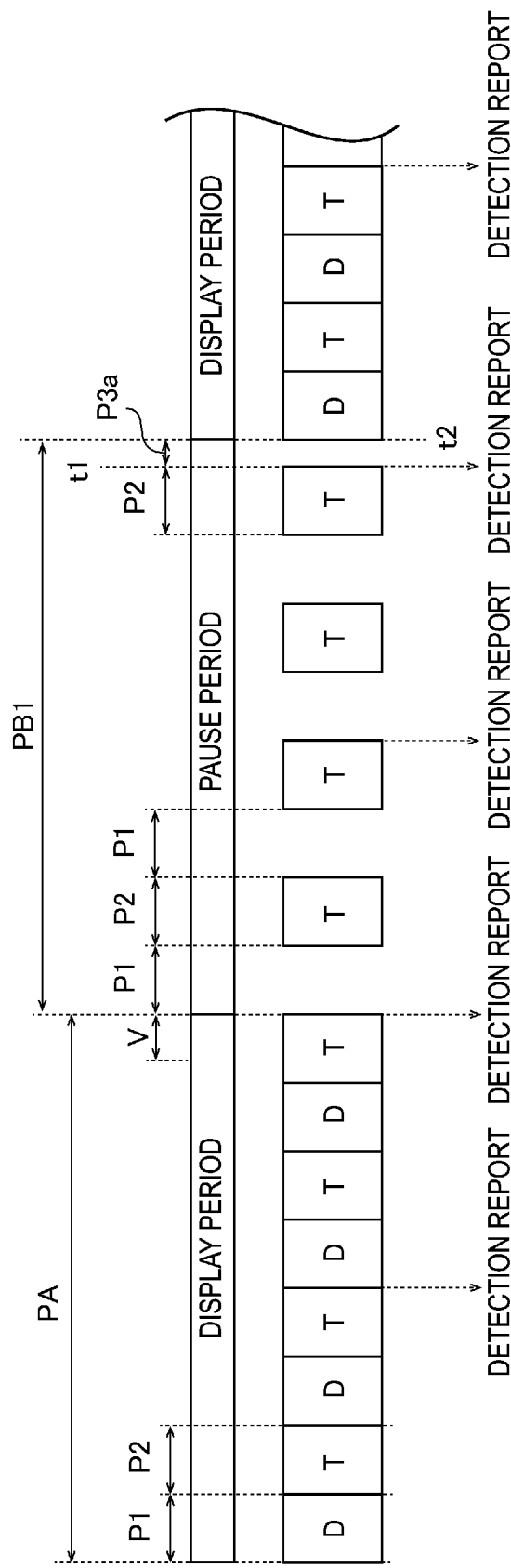
FIG. 4 is a diagram (1) illustrating operation of a display device 100 at a variable frame rate.
Figure 5:
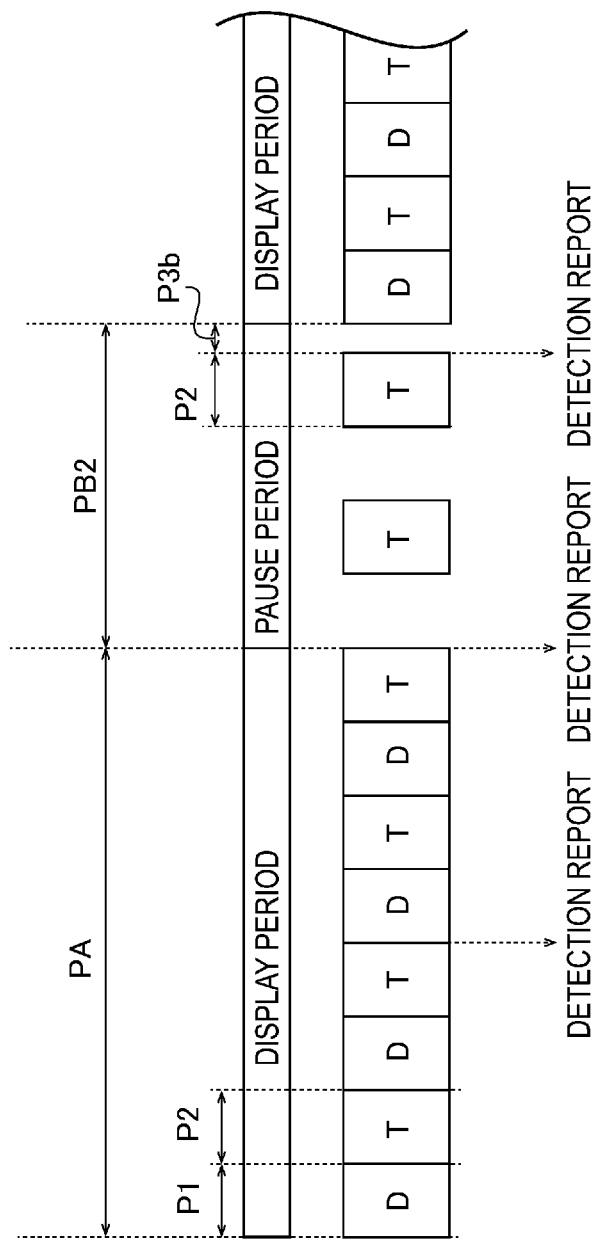
FIG. 5 is a diagram (2) illustrating operation of the display device 100 at a variable frame rate.
Figure 6:
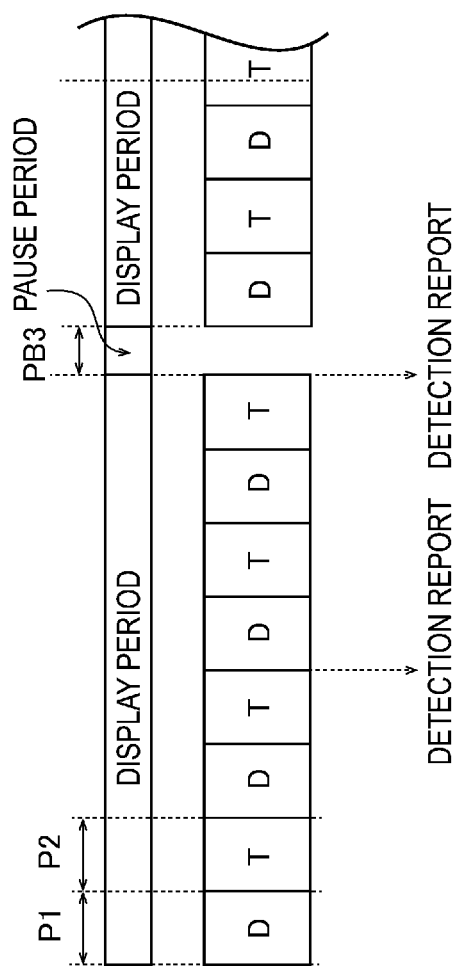
FIG. 6 is a diagram (3) illustrating operation of the display device 100 at a variable frame rate.

FIGS. 4 to 6 are diagrams illustrating operation of the display device 100 at a variable frame rate. Here, as illustrated in FIGS. 4 to 6, the display device 100 is a display device that operates at a variable frame rate. The "variable frame rate" is realized by changing the length of a pause period out of a display period and the pause period that constitute one frame. The length of the pause period may be changed regularly or may be changed randomly. The length of the pause period may be changed periodically for each frame or for a plurality of frames, or may be changed at random periods. In addition, the purpose of using the variable frame rate is not particularly limited. For example, in order to reduce power consumption, the frame rate may be changed in accordance with the amount of change (motion) in an image in a moving image. In this case, the display device 100 operates at a high frame rate (for example, 60 Hz) in a scene where there is a large change in the image, and operates at a low frame rate (for example, 30 Hz) in a scene where there is a small change in the image.

The "display period" is a period in which the display of the touch panel 1 is refreshed by executing a write process on a pixel. A vertical blanking period V (vertical fly-back period) is included in a portion of the display period (for example, in a period T) (which will be described later with reference to FIG. 4 and the like). In the first embodiment, the touch detection process and the write process are alternately performed in the display period. The "pause period" is a period during which the refresh of the display on the touch panel 1 is paused without executing the write process. In the pause period, the touch detection process is executed.

Here, when the display device with a touch panel is operated at a variable frame rate, the length of the pause period changes. Thereby, the pause period may end, and the next display period may start before the touch detection process is completed. In this case, the write process and the touch detection process may interfere with each other (may be executed at the same time). For example, a touch may not be detected normally due to application of a voltage to the pixel electrode. In addition, the potential of the pixel electrode may change due to a signal transmitted to an electrode for detecting a touch, and normal display may not be performed.

In order to prevent the write process and the touch detection process from interfering with each other, it is conceivable to pause both the write process and the touch detection process in the pause period. However, when the pause period becomes long, the frequency of the touch detection process is lowered (the rate is lowered), and a response of touch detection to the motion of the pointer becomes slow.

The display device 100 according to the first embodiment can solve the problem described above and increase the frequency of the touch detection process while the write process and the touch detection process are prevented from interfering with each other even when control is performed at a variable frame rate. Description will be given below with reference to the accompanying drawings.

The host controller 3 illustrated in FIG. 1 includes a processor (for example, a CPU) that performs control processing. The host controller 3 is a device that outputs a video signal to the display device 100. The video signal is, for example, a video signal based on a broadcast signal received by an antenna, a video signal based on data read from a storage medium, or a video signal based on data acquired from a network. The host controller 3 may be configured as a control unit of, for example, a personal computer, a television receiver, or a video playback apparatus. The host controller 3 outputs a video signal to the control circuit 2. The host controller 3 transmits information indicating the length of a pause period of the video signal to the control circuit 2. The information indicating the length of the pause period is, for example, information directly indicating the length of a pause period such as 16.66 ms, 10 ms, 5 ms, or 3 ms. The disclosure is not limited to this example, and the host controller 3 may transmit a frame rate to the control circuit 2. In this case, the control circuit 2 calculates a pause period based on the frame rate. That is, in this case, the "frame rate" transmitted from the host controller 3 is an example of the "information indicating the length of the pause period". For example, when the length of a display period is 16.66 ms and a frame rate is 60 Hz, a pause period is 0 ms, and when a frame rate is 37.5 Hz, a pause period is 10 ms.

A period during the touch detection process illustrated in FIGS. 4 to 6 is referred to as a "period T", and a period during the write process is referred to as a "period D". In addition, the length of the period D is referred to as P1, and the length of the period T is referred to as P2. The length of a display period in one frame is referred to as PA, and the length of a pause period is referred to as PB. In FIGS. 4 to 6, since the length of the pause period changes depending on the frame rate, different reference numerals such as "PB1", "PB2", and "PB3" are given to distinguish therebetween.

As illustrated in FIG. 4, the control circuit 2 alternately repeats the period D and the period T in the display period. In the example of FIG. 4, the control circuit 2 executes each of the write process and the touch detection process four times. The number of executions of the write process and the touch detection process may be a number other than four. The control circuit 2 generates a detection report every time the touch detection process is performed a plurality of times (twice in the example of FIG. 4). For example, in a first touch detection process, the control circuit 2 acquires detection signals from half of the plurality of touch detection electrodes 11 on the touch panel 1. In a second touch detection process, the control circuit 2 acquires detection signals from the remaining half of the touch detection electrodes 11. The control circuit 2 creates a map (distribution chart) of electrostatic capacitance of the entire touch panel 1. The control circuit 2 determines the position of the center of gravity (or the largest position) of a change in the electrostatic capacitance in the map as a touch position. The control circuit 2 generates information about the determined touch position as a detection report. The control circuit 2 performs processing of an application program being executed based on the detection report or transmits the detection report to the host controller 3. In FIG. 4, an example in which the control circuit 2 generates a detection report every time the touch detection process is performed twice is illustrated, but the disclosure is not limited thereto. For example, the control circuit 2 may generate a detection report every time the touch detection process is performed, or may generate a detection report every time the touch detection process is performed three times or more.

As illustrated in FIG. 1, the control circuit 2 acquires information indicating the length PB of the pause period from the host controller 3. The length P1 of the period T and the length P2 of the period D are stored in advance in the control circuit 2. The control circuit 2 determines the number of times the touch detection process can be executed within the pause period (hereinafter referred to as an "executable number of times N") based on the length PB of the pause period. For example, the control circuit 2 sets, as the executable number of times N, a number obtained by dividing the length PB of the pause period by the sum of P1 and P2 and then rounding down the resulting number to the nearest whole number. That is, the control circuit 2 calculates the executable number of times N that satisfies the following Equation (1) and Expression (2).

$$PB/(P1+P2)=X \quad (1)$$
$$N \leq X \leq N+1 \quad (2)$$

Then, the control circuit 2 executes the touch detection process the same number of times as the determined executable number of times N in the pause period. In the example illustrated in FIG. 4, the control circuit 2 executes the touch detection process four times at intervals of time P1 in the pause period. A length P3a of a period from a point in time t1 when the touch detection process executed last among the four touch detection processes to a point in time t2 when a display period of the next frame starts is smaller than P2. In the example illustrated in FIG. 5, the control circuit 2 executes a touch detection process twice at intervals of time P1 in the pause period. A length P3b of a period from a point in time when a touch detection process executed last among the two touch detection processes ends to a point in time when a display period of the next frame starts is smaller than P2. In the example illustrated in FIG. 6, the control circuit 2 does not execute the touch detection process in the pause period. The length PB3 of the pause period is smaller than P2. In the present embodiment, each of P3a, P3b, and PB3 is smaller than the sum of P1 and P2.

According to this configuration, the executable number of times N of the touch detection process is determined in advance based on the length PB of the pause period. The touch detection process is executed by the number of times equal to or less than the determined executable number of times N. Thereby, the touch detection process can be prevented from being executed from the pause period to the display period. As a result, the touch detection process and the write process executed in the display period can be prevented from interfering with each other (from being executed at the same time). Also in the pause period, the touch detection process is executed the same number of times as the executable number of times N. Thereby, the frequency of the touch detection process can be increased compared to a case where the touch detection process is not executed in the pause period. As a result, even when control is performed at a variable frame rate that changes the length of the pause period, the frequency of the touch detection process can be increased while the write process and the touch detection process are prevented from interfering with each other.

The control circuit 2 determines the executable number of times N within the display period, and executes the touch detection process the same number of times as the determined executable number of times N in the pause period immediately after the display period. Thereby, the display device 100 can determine the executable number of times N until the pause period starts. As a result, even when a frame rate changes for each frame, the frequency of the touch detection process can be increased while the write process and the touch detection process are prevented from interfering with each other.

Control Method According to First Embodiment

Figure 7:
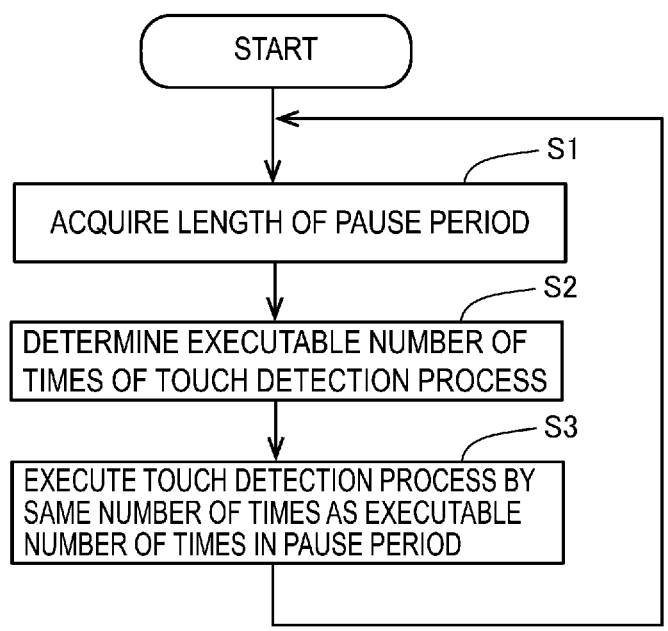
FIG. 7 is a flow diagram of control processing of the display device 100 according to the first embodiment.

Next, a method of controlling the display device 100 will be described with reference to FIG. 7. FIG. 7 is a flow diagram of control processing of the display device 100 according to the first embodiment. The control processing of the display device 100 is executed by the control circuit 2.

In step S1, the length PB of the pause period is acquired. For example, information including the length PB of the pause period is transmitted from the host controller 3 to the display device 100, and the display device 100 receives the information.

In step S2, a number obtained by dividing the length PB of the pause period by the sum of P1 and P2 and then rounding down the resulting number to the nearest whole number is calculated, and the calculated number is determined to be an executable number of times N. For example, the processing of step S2 is executed within a display period.

In step S3, in the pause period immediately after step S2 is executed, a touch detection process is executed the same number of times as the executable number of times N determined in step S2. The processing of steps S1 to S3 is repeated for each frame.

According to this control method, the executable number of times N of the touch detection process is determined in advance based on the length PB of the pause period. The touch detection process is executed the same number of times as the determined executable number of times N. Thereby, the touch detection process can be prevented from being executed from the pause period to the display period. As a result, the touch detection process and the write process executed in the display period can be prevented from interfering with each other (from being executed at the same time). Also in the pause period, the touch detection process is executed by the number of times equal to or less than the executable number of times N. Thereby, the frequency of the touch detection process can be increased compared to a case where the touch detection process is not executed in the pause period. As a result, even when control is performed at a variable frame rate that changes the length of the pause period, the frequency of the touch detection process can be increased while the write process and the touch detection process are prevented from interfering with each other.

Second Embodiment

Next, a configuration of a display device 200 with a touch panel (hereinafter referred to as a "display device 200") according to a second embodiment will be described with reference to FIG. 8. In the display device 200 according to the second embodiment, an executable number of times N is determined by a host controller 203. The same configurations as those in the first embodiment are denoted by the same reference numerals, and description thereof will be omitted.

Figure 8:
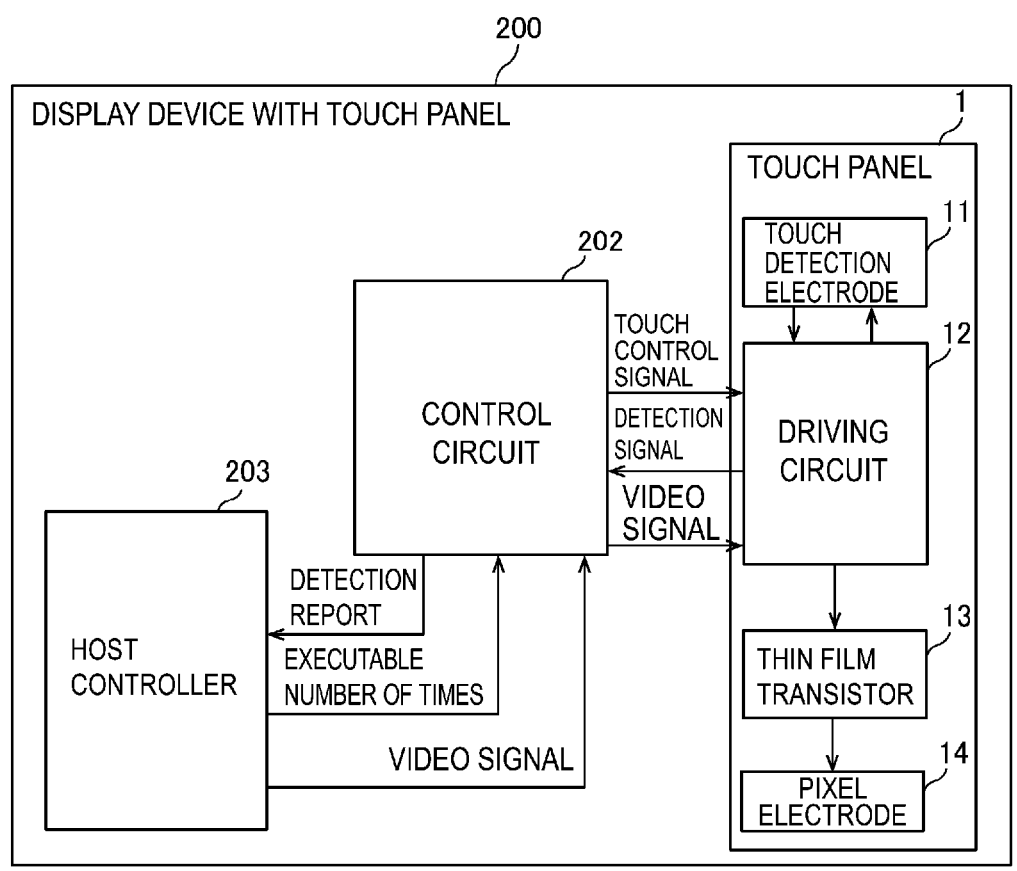
FIG. 8 is a block diagram illustrating a configuration of a display device 200 with a touch panel according to a second embodiment.

FIG. 8 is a block diagram illustrating a configuration of the display device 200 according to the second embodiment. As illustrated in FIG. 8, the display device 200 includes a control circuit 202 and the host controller 203. In the second embodiment, a length P1 of a period D (see FIG. 4) and a length P2 of a period T (see FIG. 4) are stored in advance in the host controller 203. The host controller 203 calculates a number obtained by dividing a length PB of a pause period of a video signal to be output by the sum of P1 and P2 and then rounding down the resulting number to the nearest whole number. The host controller 203 determines the calculated number as an executable number of times N. The host controller 203 transmits the executable number of times N to the control circuit 202 of the display device 200. The control circuit 202, executes a touch detection process the same number of times as the received executable number of times N in a pause period. Other configurations are the same as the configurations in the first embodiment.

Control Method According to Second Embodiment

Figure 9:
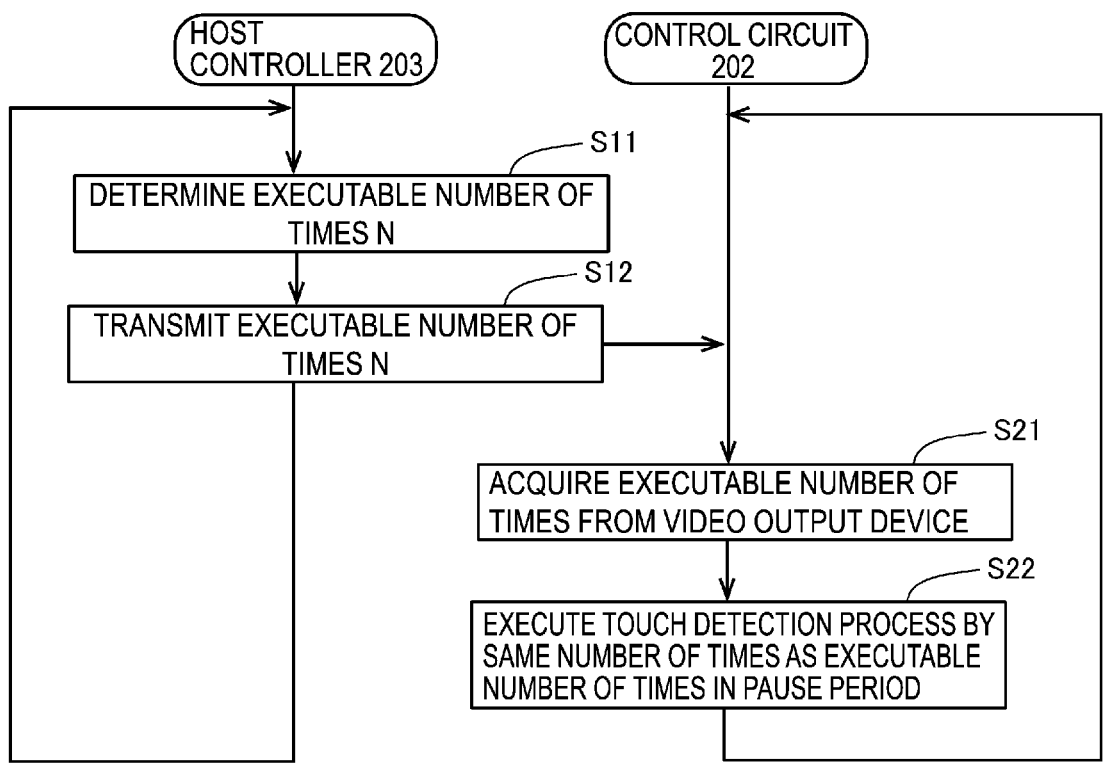
FIG. 9 is a flow diagram of control processing of the display device 200 with the touch panel according to the second embodiment.

Next, a method of controlling the display device 200 according to the second embodiment will be described with reference to FIG. 9. FIG. 9 is a flow diagram of control processing of the display device 200 according to the second embodiment.

In step S11 executed by the host controller 203, a number obtained by dividing the length PB of the pause period by the sum of P1 and P2 and then rounding down the resulting number to the nearest whole number is calculated. Then, the calculated number is determined to be an executable number of times N.

In step S12 executed by the host controller 203, the executable number of times N is transmitted to the display device 200. Steps S11 and S12 are performed for each frame.

In step S21 executed by the control circuit 202, the display device 200 receives the executable number of times N transmitted from the host controller 203.

In step S22 executed by the control circuit 202, a touch detection process is executed the same number of times as the executable number of times N determined by the host controller 203 in a pause period immediately after step S21 is executed. The processing of steps S21 and S22 is repeated for each frame.

Also in the second embodiment, the executable number of times N of the touch detection process is determined in advance based on the length PB of the pause period. The touch detection process is executed the same number of times as the determined executable number of times N. Thereby, the touch detection process can be prevented from being executed from the pause period to the display period. As a result, the touch detection process and the write process executed in the display period can be prevented from interfering with each other (from being executed at the same time). Also in the pause period, the touch detection process is executed the same number of times as the executable number of times N. Thereby, the frequency of the touch detection process can be increased compared to a case where the touch detection process is not executed in the pause period. As a result, even when control is performed at a variable frame rate that changes the length of the pause period, the frequency of the touch detection process can be increased while the write process and the touch detection process are prevented from interfering with each other.

Third Embodiment

Next, a configuration of a display system 300a according to a third embodiment will be described with reference to FIG. 10. In the display system 300a according to the third embodiment, a control circuit 302 measures a length PB of a pause period and determines an executable number of times N based on the measured length PB of the pause period. The same configurations as those in the first or second embodiment are denoted by the same reference numerals, and description thereof will be omitted.

Figure 10:
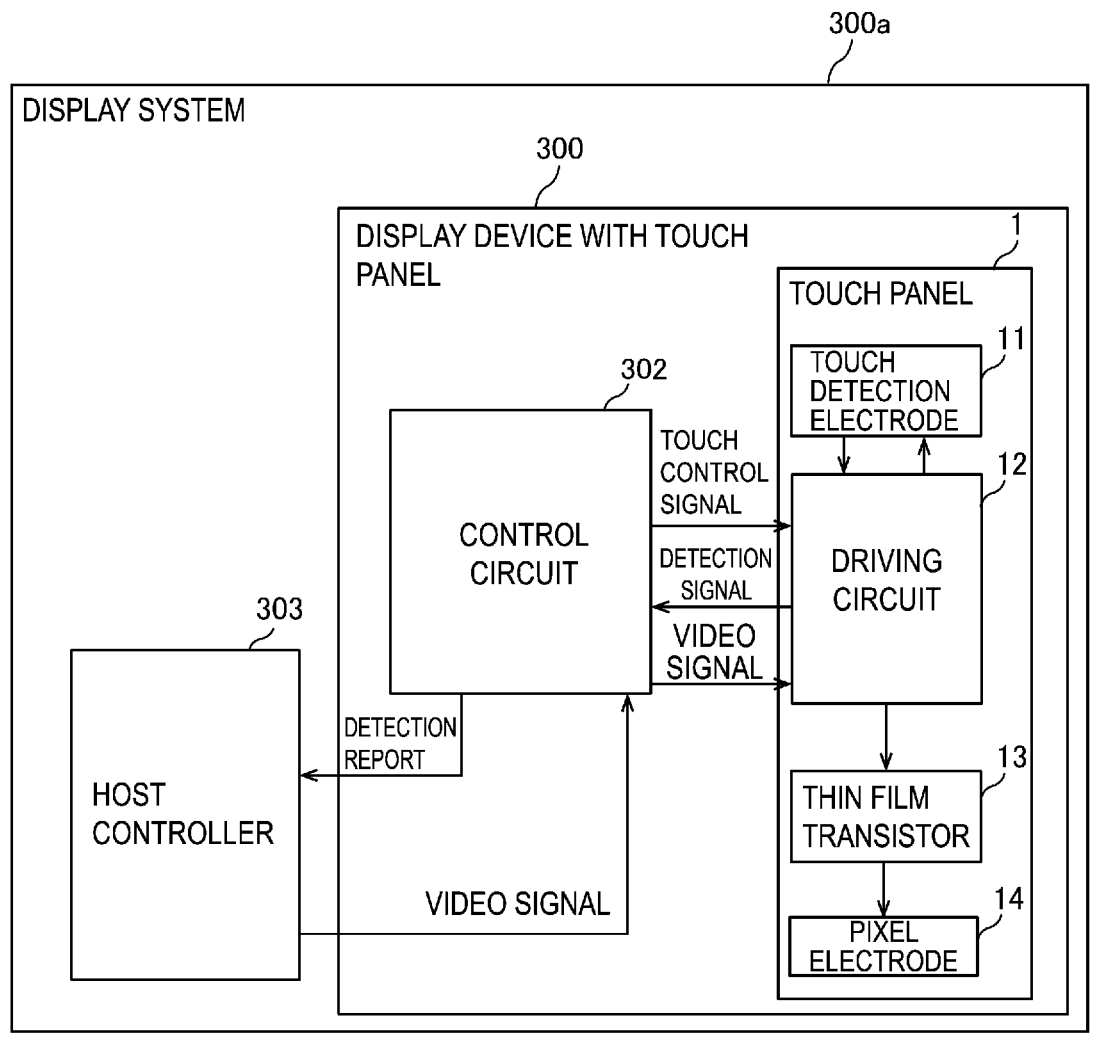
FIG. 10 is a block diagram illustrating a configuration of a display system 300a according to a third embodiment.

FIG. 10 is a block diagram illustrating a configuration of the display system 300a according to the third embodiment. As illustrated in FIG. 10, the display system 300a includes a display device 300 with a touch panel (hereinafter referred to as a "display device 300") and a host controller 303. The display device 300 includes the control circuit 302. In the third embodiment, unlike the host controller 3 that transmits the length of a pause period according to the first embodiment, the host controller 303 does not transmit the length of a pause period to the display device 300 (transmits only a video signal to the display device 300).

Figure 11:
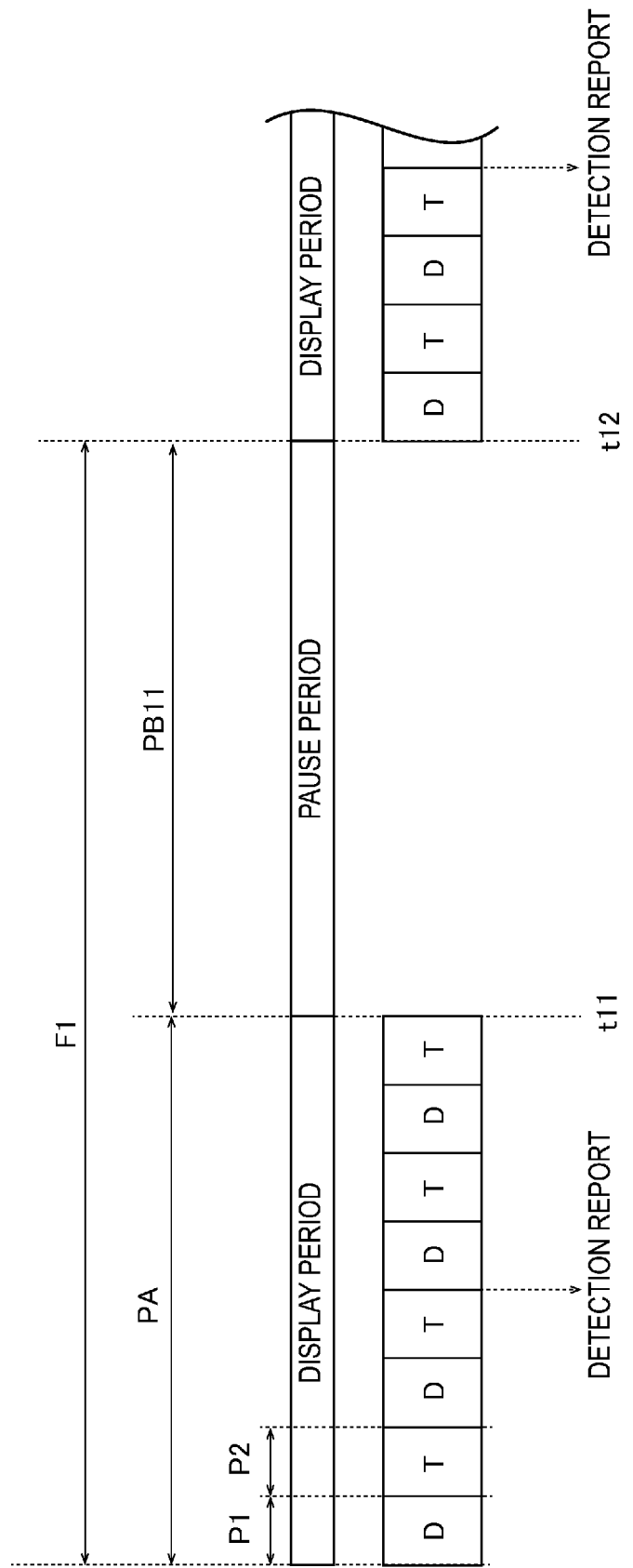
FIG. 11 is a diagram (1) illustrating an example of control of a display device 300 according to the third embodiment.
Figure 12:
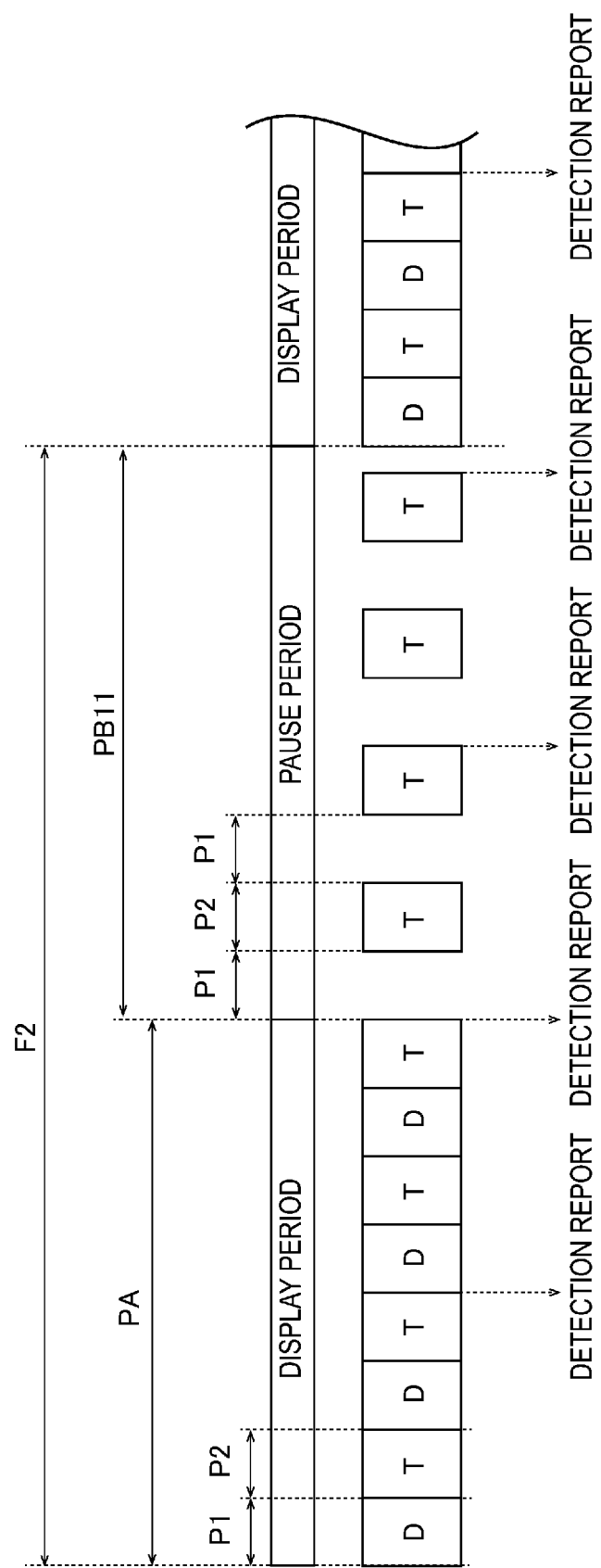
FIG. 12 is a diagram (2) illustrating an example of control of the display device 300 according to the third embodiment.

FIGS. 11 and 12 are diagrams illustrating an example of control of the display device 300 according to the third embodiment. The control circuit 302 measures a length PB11 of a pause period of a preceding first frame (hereinafter referred to as a "frame F1") in two consecutive frames, determines an executable number of times N based on the length PB11 of the pause period, and executes a touch detection process the same number of times as the determined executable number of times N in a pause period of a frame F2 subsequent to the frame F1.

For example, as illustrated in FIG. 11, when a video signal of the first frame F1 is received from the host controller 303, the control circuit 302 measures the length PB11 of the pause period. The control circuit 302 calculates a number obtained by dividing the length PB11 of the pause period by the sum of P1 and P2 and then rounding down the resulting number to the nearest whole number, and sets the calculated number as the executable number of times N. As illustrated in FIG. 12, the control circuit 302 executes a touch detection process the same number of times as the executable number of times N in a pause period of the frame F2. In FIG. 12, the length of the pause period of the frame F2 is equal to the length PB11 of the pause period of the frame F1, but may be a length other than PB11.

Also in a pause period after the frame F2, the control circuit 302 measures a length PB of the pause period, determines an executable number of times N based on the measured length PB of the pause period, and executes a touch detection process the same number of times as the executable number of times N in a pause period of a frame subsequent to the frame in which the length PB of the pause period is measured. Thereby, even when a frame rate is changed, a touch detection process can be executed by an appropriate number of times from a second frame after the change. Other configurations are the same as the configurations in the first embodiment.

Control Method According to Third Embodiment

Figure 13:
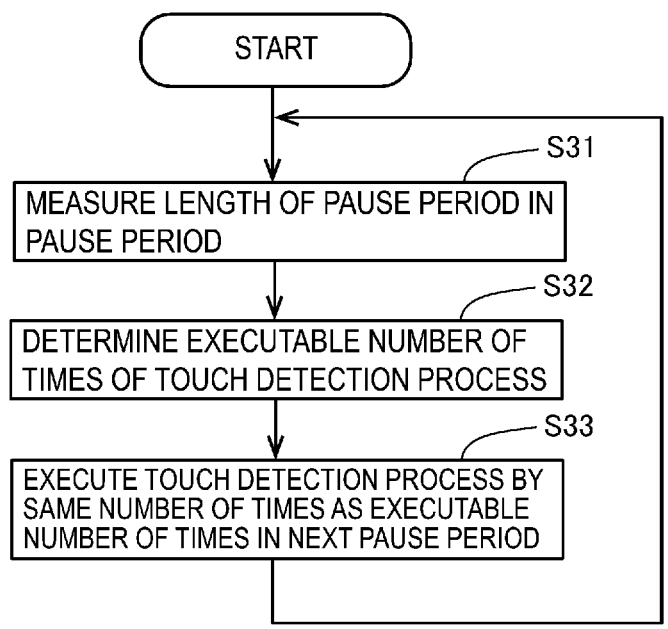
FIG. 13 is a flow diagram of control processing of the display device 300 according to the third embodiment.

Next, a method of controlling the display device 300 according to the third embodiment will be described with reference to FIG. 13. FIG. 13 is a flow diagram of control processing of the display device 300 according to the third embodiment. The control processing of the display device 300 is executed by the control circuit 302.

In step S31, the length PB of the pause period is measured during the pause period.

In step S32, a number obtained by dividing the measured length PB of the pause period by the sum of P1 and P2 and then rounding down the resulting number to the nearest whole number, and the calculated number is determined to be an executable number of times N.

In step S33, a touch detection process is executed the same number of times as the executable number of times N in a pause period subsequent to the frame in which step S31 is executed. The processing of steps S31 to 33 is repeated for each frame. That is, the touch detection process is performed in step S33 while the length PB of the pause period is measured.

According to the third embodiment, even when the display device 300 cannot acquire information about the length of the pause period from the host controller 303 (when the host controller 303 does not have a function of transmitting the length PB of the pause period), the executable number of times N can be calculated based on the measured length PB of the pause period. Thereby, also in the third embodiment, even when control is performed at a variable frame rate, the frequency of the touch detection process can be increased while the write process and the touch detection process are prevented from interfering with each other. In two consecutive frames, in a situation where a length PB of a pause period of a subsequent frame is extremely smaller than a length PB of a pause period of a preceding frame, a touch detection process and a write process may interfere with each other. However, in a situation other than the situation, the frequency of a touch detection process can be increased while a write process and the touch detection process are prevented from interfering with each other.

Modifications and the Like

The above-described embodiments are merely examples for carrying out the disclosure. Accordingly, the disclosure is not limited to the embodiments described above and can be implemented by modifying the embodiments described above as appropriate without departing from the scope of the disclosure.

(1) In the first to third embodiments described above, an example in which a number obtained by dividing a length PB of a pause period by the sum of P1 and P2 and then rounding down the resulting number to the nearest whole number is used as an executable number of times N has been described, but a method of determining the executable number of times N is not limited to this example. For example, a table in which the length PB of the pause period and the executable number of times N are associated with each other may be stored in advance in the control circuit or the host controller, and the control circuit or the host controller may be configured to determine the executable number of times N corresponding to the acquired length PB of the pause period with reference to the table.

(2) In the first and second embodiments described above, an example in which an executable number of times is determined within a display period, and a touch detection process is executed the same number of times as the determined executable number of times in a pause period immediately after the display period (the pause period in the same frame as the display period) has been described, but the disclosure is not limited to this example. That is, in a frame after the frame in which the executable number of times is determined, a touch detection process may be executed the same number of times as the determined executable number of times.

(3) In the first to third embodiments described above, an example in which a touch detection process is performed the same number of times as an executable number of times in a pause period has been described, but the disclosure is not limited to this example. That is, the touch detection process may be executed by the number of times smaller than the executable number of times in the pause period.

(4) In the first to third embodiments described above, an example in which a frame rate is changed in a range of equal to or less than 60 Hz has been described, but the disclosure is not limited thereto. For example, when the length of a display period is smaller than 16.66 ms and the length of a pause period is greater than 0 ms even when a frame rate is 60 Hz, the length of the pause period may be reduced to make the frame rate higher than 60 Hz.

The above-described configuration can be described as follows.

A display device with a touch panel according to a first configuration is a display device with a touch panel configured to operate at a variable frame rate that is realized by changing a length of a pause period out of a display period and the pause period, both the display period and the pause period constituting one frame, the display device including a touch panel including a pixel electrode, and a control unit configured to execute a write process of writing a data signal on the pixel electrode and a touch detection process by the touch panel, in which the control unit is configured to determine an executable number of times of the touch detection process based on the length of the pause period, alternately execute the touch detection process and the write process in the display period, and execute the touch detection process a number of times equal to or less than the determined executable number of times in the pause period (first configuration).

According to the first configuration, the executable number of times of the touch detection process is determined in advance based on the length of the pause period, and the touch detection process is performed the same number of times as the determined executable number of times. Thereby, the touch detection process can be prevented from being executed over the display period beyond the pause period. As a result, the touch detection process and the write process executed in the display period can be prevented from interfering with each other. Also in the pause period, the touch detection process is executed by the number of times equal to or less than the executable number of times. Thereby, the frequency of the touch detection process can be increased compared to a case where the touch detection process is not executed in the pause period. As a result, even when control is performed at a variable frame rate that changes the length of the pause period, the frequency of the touch detection process can be increased while the write process and the touch detection process are prevented from interfering with each other.

In the first configuration, the control unit may be configured to determine an executable number of times of the touch detection process within the display period, and execute the touch detection process a number of times equal to or less than the determined executable number of times in a pause period immediately after the display period (second configuration).

According to the second configuration, the executable number of times can be determined until the pause period starts. As a result, even when the frame rate changes for each frame, the frequency of the touch detection process can be increased while the write process and the touch detection process are prevented from interfering with each other.

In the first configuration, in two consecutive frames, the control unit may be configured to measure a length of a pause period of a preceding first frame, determine an executable number based on the length of the pause period, and execute the touch detection process a number of times equal to or less than the determined executable number in a pause period of a second frame subsequent to the preceding first frame (third configuration).

According to the third configuration, the display device with the touch panel can measure the length of the pause period. Thereby, even when the display device with the touch panel cannot acquire information about the length of the pause period from an external device (for example, a host controller), the executable number of times can be determined based on the measured length of the pause period.

In any one of the first to third configurations, the control unit may be configured to execute the touch detection process by the same number of times as the determined executable number of times in the pause period (fourth configuration).

According to the fourth configuration, the touch detection process can be executed by a maximum executable number of times during the pause period. As a result, the frequency of the touch detection process can be increased.

A method of controlling a display device with a touch panel according to a fifth configuration is a method of controlling a display device with a touch panel including a pixel electrode and configured to operate at a variable frame rate that is realized by changing a length of a pause period out of a display period and the pause period, both the display period and the pause period constituting one frame, the method including determining an executable number of times of a touch detection process based on the length of the pause period, alternately executing a write process of writing a data signal on the pixel electrode and the touch detection process by the touch panel in the display period, and executing the touch detection process a number of times equal to or less than the determined executable number of times in the pause period (fifth configuration).

According to the fifth configuration, the executable number of times of the touch detection process is determined in advance based on the length of the pause period. The touch detection process is executed by the number of times equal to or less than the determined executable number of times. Thereby, the touch detection process can be prevented from being executed from the pause period to the display period. As a result, the touch detection process and the write process executed in the display period can be prevented from interfering with each other. Also in the pause period, the touch detection process is executed by the number of times equal to or less than the executable number of times. Thereby, the frequency of the touch detection process can be increased compared to a case where the touch detection process is not executed in the pause period. As a result, it is possible to provide a method of controlling a display device with a touch panel, which can increase the frequency of the touch detection process while the write process and the touch detection process are prevented from interfering with each other even when control is performed at a variable frame rate that changes the length of the pause period.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device with a touch panel configured to operate at a variable frame rate that is realized by changing a length of a pause period out of a display period and the pause period, both the display period and the pause period forming one frame, the display device comprising:
   the touch panel including a pixel electrode; and
   a control unit configured to alternately execute, by the touch panel and during the display period, a write process of writing a data signal on the pixel electrode, and a touch detection process,
   wherein the control unit is further configured to:
      in two consecutive frames, measure a length of the pause period of a preceding first frame,
      based on the measured length of the pause period of the preceding first frame, determine an executable number of times of the touch detection process, to be executed in the pause period of a second frame, of the two consecutive frames, subsequent to the preceding first frame, and
      execute the touch detection process a number of times equal to or less than the determined executable number of times in the pause period of the second frame.

2. The display device with the touch panel according to claim 1,
   wherein the control unit executes the touch detection process by the same number of times as the determined executable number of times in the pause period of the second frame.

3. A method of controlling a display device with a touch panel including a pixel electrode and configured to operate at a variable frame rate that is realized by changing a length of a pause period out of a display period and the pause period, both the display period and the pause period forming one frame, the method comprising:
   alternately executing, by the touch panel and during the display period, a write process of writing a data signal on the pixel electrode, and the touch detection process;
   in two consecutive frames, measuring a length of the pause period of a preceding first frame;
   based on the measured length of the pause period of the preceding first frame, determining an executable number of times of the touch detection process to be executed in the pause period of a second frame, of the two consecutive frames, subsequent to the preceding first frame; and
   executing the touch detection process a number of times equal to or less than the determined executable number of times in the pause period of the second frame.

* * * * *